United States Patent
Kano et al.

(10) Patent No.: US 10,903,462 B2
(45) Date of Patent: Jan. 26, 2021

(54) ELECTRIC STORAGE DEVICE

(71) Applicant: HONDA MOTOR CO., LTD., Tokyo (JP)

(72) Inventors: Hiroshi Kano, Wako (JP); Daijiro Takizawa, Wako (JP); Shinya Nakayama, Wako (JP); Harumi Takedomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 540 days.

(21) Appl. No.: 15/138,218

(22) Filed: Apr. 26, 2016

(65) Prior Publication Data

US 2016/0359153 A1 Dec. 8, 2016

(30) Foreign Application Priority Data

Jun. 4, 2015 (JP) .................................. 2015-113974

(51) Int. Cl.
*H01M 2/10* (2006.01)

(52) U.S. Cl.
CPC ...... *H01M 2/1077* (2013.01); *H01M 2220/20* (2013.01)

(58) Field of Classification Search
CPC .... H01M 2/1077; H01M 2220/20; B60K 1/04
USPC ............................................................. 429/99
See application file for complete search history.

(56) References Cited

U.S. PATENT DOCUMENTS 6,326,103 B1 * 12/2001 Ido .................... H01M 2/024
429/148

FOREIGN PATENT DOCUMENTS

| JP | 2013-032065 | 2/2013 | |
| JP | 2013-122820 | 6/2013 | |
| KR | 100590050 B1 * | 6/2006 | .......... H01M 10/625 |

OTHER PUBLICATIONS

Machine Translation of Kitani Nobuaki et al. JP 2013032065 A, "Structure for Mounting Electric Storage Device" (Year: 2013).*
Machine Translation KR590050B1 (Year: 2006).*
Chinese Office Action for corresponding CN Application No. 201610236449.7, dated May 10, 2018 (w/ English machine translation).

* cited by examiner

*Primary Examiner* — Victoria H Lynch
(74) *Attorney, Agent, or Firm* — Mori & Ward, LLP

(57) ABSTRACT

An electric storage device includes a storage module and a mounting plate. The storage module includes a plurality of storage cells stacked in a stacking direction and has an end surface in the stacking direction. The storage module is mounted on the mounting plate. The mounting plate includes a fastening part and a displacement absorbing part. The storage module is connected to the mounting plate at the fastening part. The displacement absorbing part absorbs displacement of the storage module in the stacking direction. The fastening part is provided between the displacement absorbing part and the end surface of the storage module in the stacking direction.

18 Claims, 9 Drawing Sheets

ELECTRIC STORAGE DEVICE

CROSS-REFERENCE TO RELATED APPLICATIONS

The present application claims priority under 35 U.S.C. § 119 to Japanese Patent Application No. 2015-113974, filed Jun. 4, 2015, entitled "Electric Storage Device." The contents of this application are incorporated herein by reference in their entirety.

BACKGROUND

1. Field

The present disclosure relates to an electric storage device.

2. Description of the Related Art

In a general storage module (battery module), a plurality of storage cells (battery cells) are stacked. Since the storage module is mounted in an electric motor vehicle such as a hybrid vehicle or an EV, the output voltage is set high by stacking multiple storage cells.

A pair of end plates are disposed at opposite ends of the storage module in a stacking direction of the storage cells, and the pair of end plates are fastened, for example, by a pair of ladder frames disposed in the stacking direction along side surfaces of the storage cells. At this time, since the storage module is formed by stacking a plurality of storage cells, thickness tolerances of the storage cells accumulate, and this causes variations in the length of the storage module.

Accordingly, for example, Japanese Unexamined Patent Application Publication No. 2013-122820 discloses a battery module unit in which a pair of battery modules are arranged in series and combined. In each of the battery modules, a plurality of battery cells are stacked and clamped between a first end plate and a second end plate, and the first end plate and the second end plate are connected by connecting members.

Further, the connecting members are each fixed at one end to the second end plate, and fixed at the other end to the first end plate with a tolerance absorbing member being disposed therebetween, and the first end plates of the pair of battery modules are formed by a single common member.

This publication describes that, even if a difference in length in the stacking direction is caused between the battery modules by accumulation of the thickness tolerances of the battery cells, the difference can be absorbed by changing the positions of the second end plates.

SUMMARY

According to a first aspect of the present invention, an electric storage device includes a storage module and a mounting plate. A plurality of storage cells are stacked in the storage module. The mounting plate is connected to the storage module by being connected to a fastening part provided in the storage module. The mounting plate has a displacement absorbing part that extends in a cell side surface direction intersecting a stacking direction of the storage cells and absorbs displacement in the stacking direction by being deformed by a load in the stacking direction. The displacement absorbing part is provided on an inner side of the fastening part in the stacking direction.

According to a second aspect of the present invention, an electric storage device includes a storage module and a mounting plate. The storage module includes a plurality of storage cells stacked in a stacking direction and has an end surface in the stacking direction. The storage module is mounted on the mounting plate. The mounting plate includes a fastening part and a displacement absorbing part. The storage module is connected to the mounting plate at the fastening part. The displacement absorbing part absorbs displacement of the storage module in the stacking direction. The fastening part is provided between the displacement absorbing part and the end surface of the storage module in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
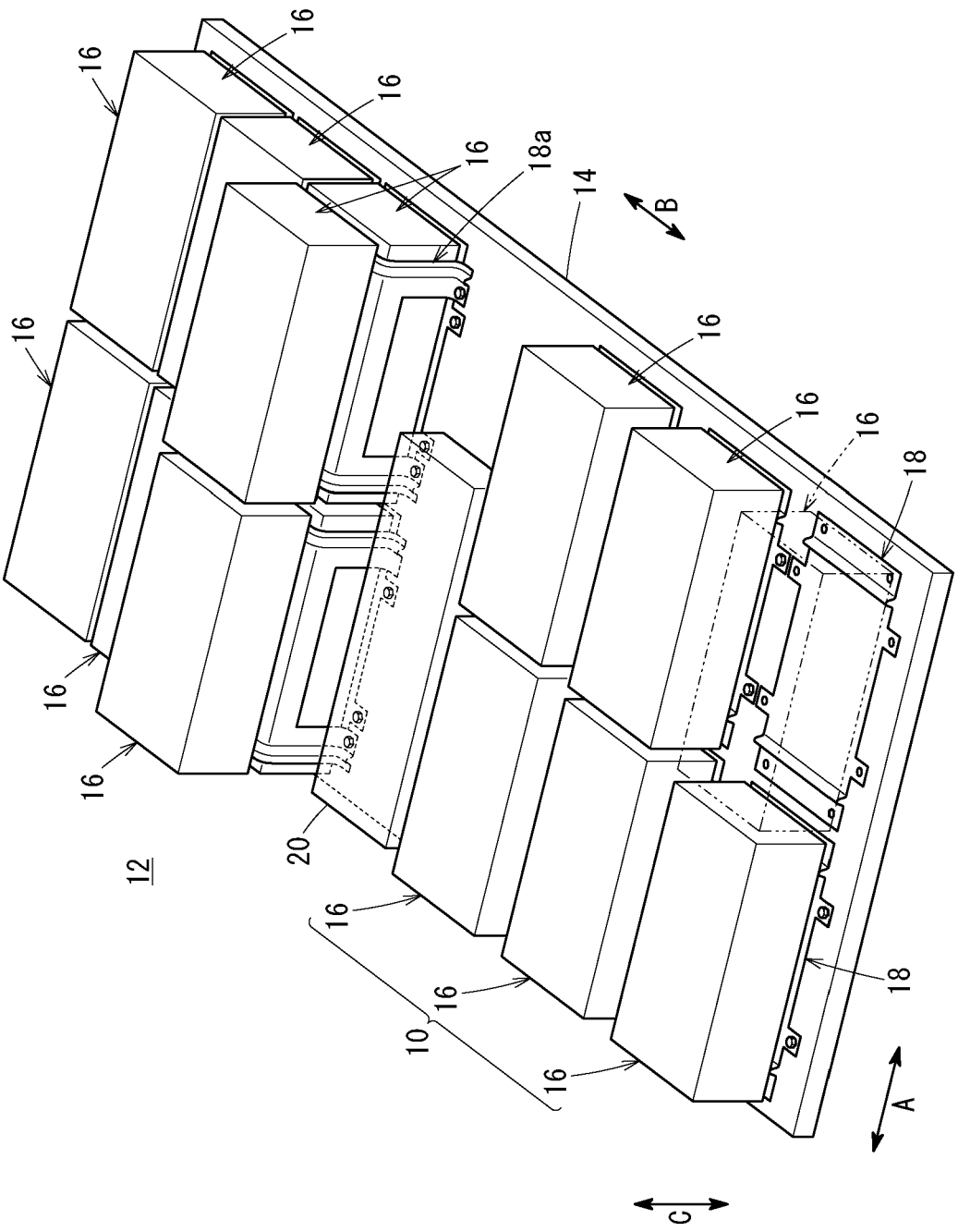
FIG. 1 is an explanatory perspective view of the principal part of a power unit in which an electric storage device according to a first embodiment of the present disclosure is incorporated.

The embodiments will now be described with reference to the accompanying drawings, wherein like reference numerals designate corresponding or identical elements throughout the various drawings.

As illustrated in FIG. 1, an electric storage device 10 according to a first embodiment of the present disclosure is incorporated in a power unit 12. The power unit 12 is mounted in an electric motor vehicle (for example, a hybrid vehicle or an EV). A drive motor (not illustrated) of the electric motor vehicle is driven by electric power supplied from the power unit 12.

The power unit 12 includes a fixing plate (attachment part) 14 provided in a vehicle body frame (not illustrated). On the fixing plate 14, a plurality of storage modules 16 that constitute the electric storage device 10 are mounted with a mounting plate 18 being disposed therebetween. On arbitrary storage modules 16, other storage modules 16 are stacked with a mounting plate 18a attached to the fixing plate 14 being disposed therebetween.

A control unit 20 is mounted in a space on almost the center of the fixing plate 14. The control unit 20 includes various devices such as an inverter device, a relay device, and a battery ECU.

Figure 2:
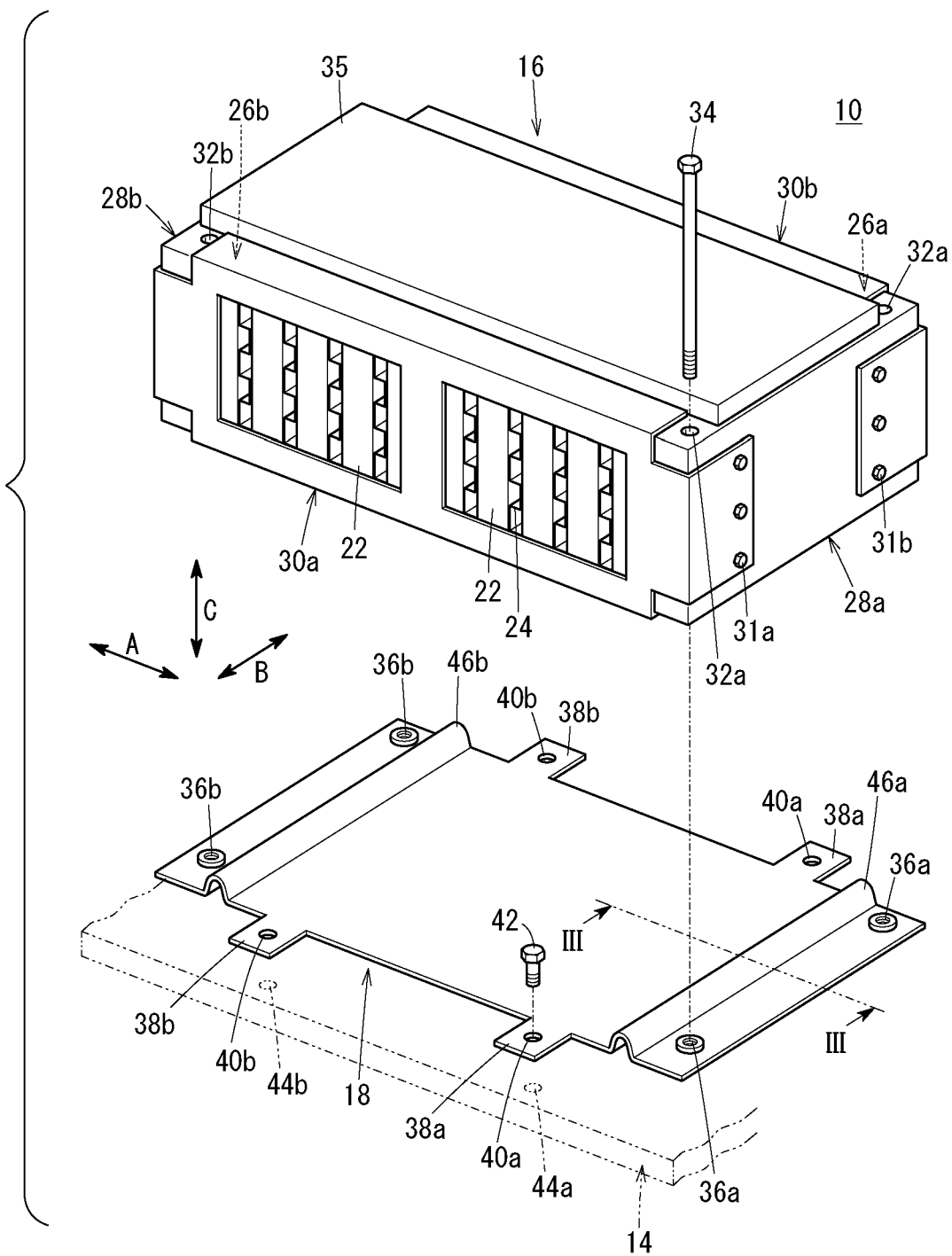
FIG. 2 is an exploded explanatory perspective view of the electric storage device.

As illustrated in FIG. 2, in each storage module 16, a plurality of storage cells 22 are stacked in the horizontal direction (direction of arrow A). The storage cells 22 are rectangular, and are stacked in the direction of arrow A while being arranged in a standing posture so as to alternate with separators (holders) 24 having the electrical insulation property. For example, the storage cells 22 are formed by lithium ion batteries and have a rectangular shape (or a square shape).

At opposite ends of the stack of the storage cells 22 in the stacking direction, rectangular (or square) end plates 28a and 28b are disposed with insulator plates 26a and 26b (or the separators 24) having the heat insulating function and the electric insulating function being disposed therebetween. The end plates 28a and 28b are connected by, for example, a pair of connection bands 30a and 30b arranged at opposite ends in the direction of arrow B and extending in the direction of arrow A. Thus, a plurality of storage cells 22 are held integrally.

The end plates 28a and 28b are substantially shaped like a flat plate. End portions of the connection bands 30a and 30b are fixed to end portions of the end plates 28a and 28b in the direction of arrow B by a plurality of screws 31a and 31b. Holes 32a vertically penetrate the end portions of the end plate 28a in the direction of arrow B, and holes 32b vertically penetrate the end portions of the end plate 28b in the direction of arrow B. Fixing screws 34 serving as a fastening part are inserted in the holes 32a and 32b.

For example, a busbar unit 35 is attached to an upper part of the storage module 16. The busbar unit 35 electrically connects a positive electrode terminal of one of adjacent storage cells 22 and a negative electrode terminal of the other storage cell 22. The plural storage cells 22 are electrically connected in series by the busbar unit 35.

The mounting plate 18 is formed by a metal plate that is long in the stacking direction (direction of arrow A) of the storage cells 22. A pair of screw holes 36a are provided in one end portion of the mounting plate 18 in the direction of arrow A, and a pair of screw holes 36b are provided in the other end portion of the mounting plate 18 in the direction of arrow A. The screw holes 36a and 36b are disposed coaxially with the holes 32a and 32b of the end plates 28a and 28b, respectively, and the fixing screws 34 are screwed therein.

Flange portions 38a and 38b serving as a fixing part project in the direction of arrow B intersecting the direction of arrow A from long sides of the mounting plate 18 in the direction of arrow B. A pair of flange portions 38a are provided at an end close to the pair of screw holes 36a, and a pair of flange portions 38b are provided at an end close to the pair of screw holes 36b.

The flange portions 38a and 38b have holes 40a and 40b, respectively, and screws 42 inserted in the holes 40a and 40b are screwed in screw holes 44a and 44b provided in the fixing plate 14. The mounting plate 18 is fixed to the fixing plate 14 by inserting the screws 42 in the holes 40a and 40b and screwing the screws 42 in the screw holes 44a and 44b.

The mounting plate 18 has displacement absorbing parts 46a and 46b that extend in the direction of arrow B (a cell side surface direction intersecting the stacking direction of the storage cells 22) and absorb displacement in the stacking direction by being deformed by the load in the stacking direction.

Figure 3:
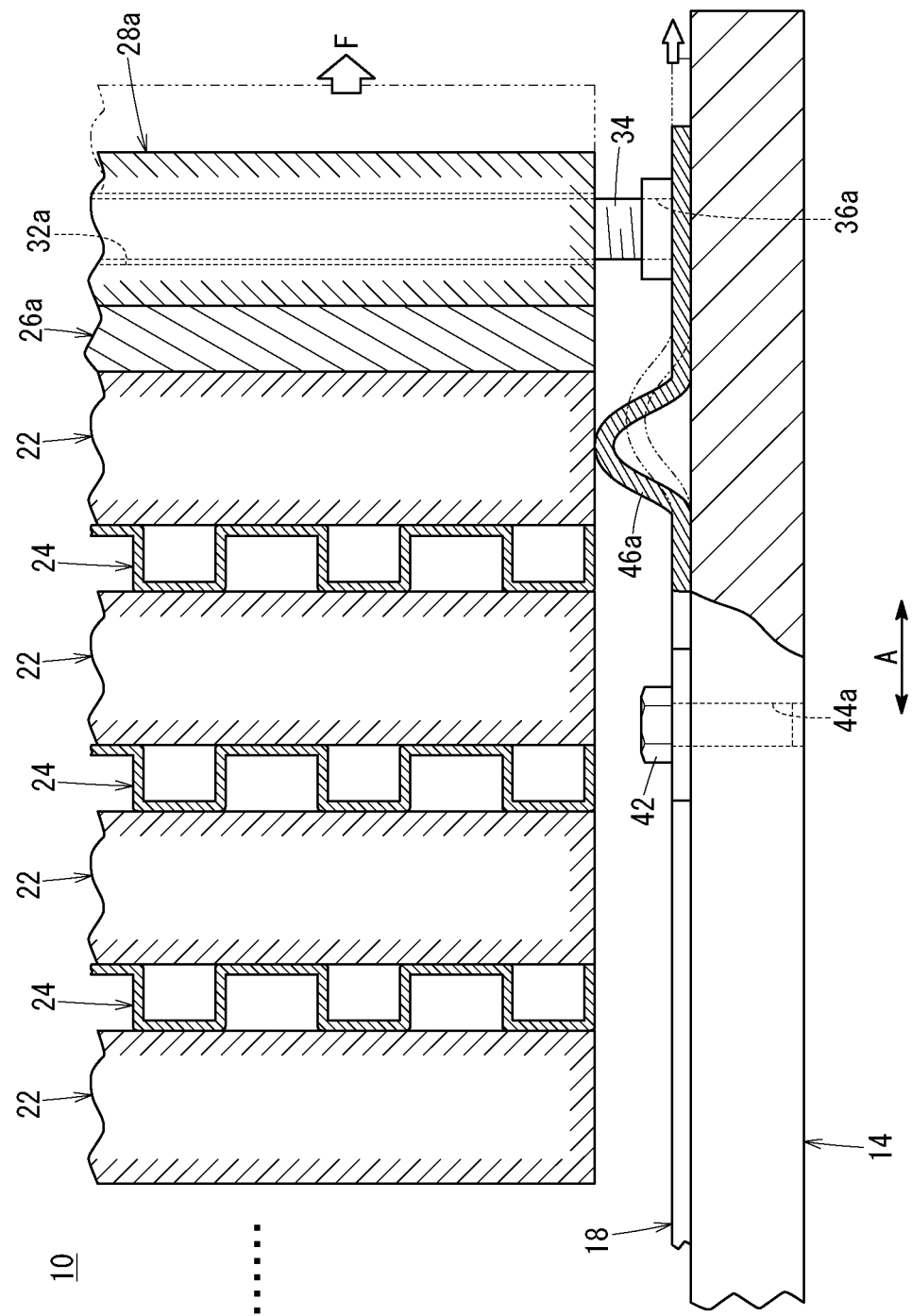
FIG. 3 is an explanatory cross-sectional view of the electric storage device, taken along line of FIG. 2.

As illustrated in FIGS. 2 and 3, the displacement absorbing part 46a is provided on an inner side of the screw holes 36a (fastening part) in the stacking direction, more specifically, between the fixing screws 34 and the screws 42 (fixing part) in the stacking direction. The displacement absorbing part 46a is a curved portion extending in the direction of arrow B (cell side surface direction), and has a wavy shape in a side view of the mounting plate 18 from the direction of arrow B.

As illustrated in FIG. 2, the displacement absorbing part 46b is provided on an inner side of the screw holes 36b (fastening part) in the stacking direction, more specifically, between the fixing screws 34 and the screws 42 (fixing part) in the stacking direction. The displacement absorbing part 46b is a curved portion extending in the direction of arrow B (cell side surface direction), and has a wavy shape in a side view of the mounting plate 18 from the direction of arrow B.

Figure 4:
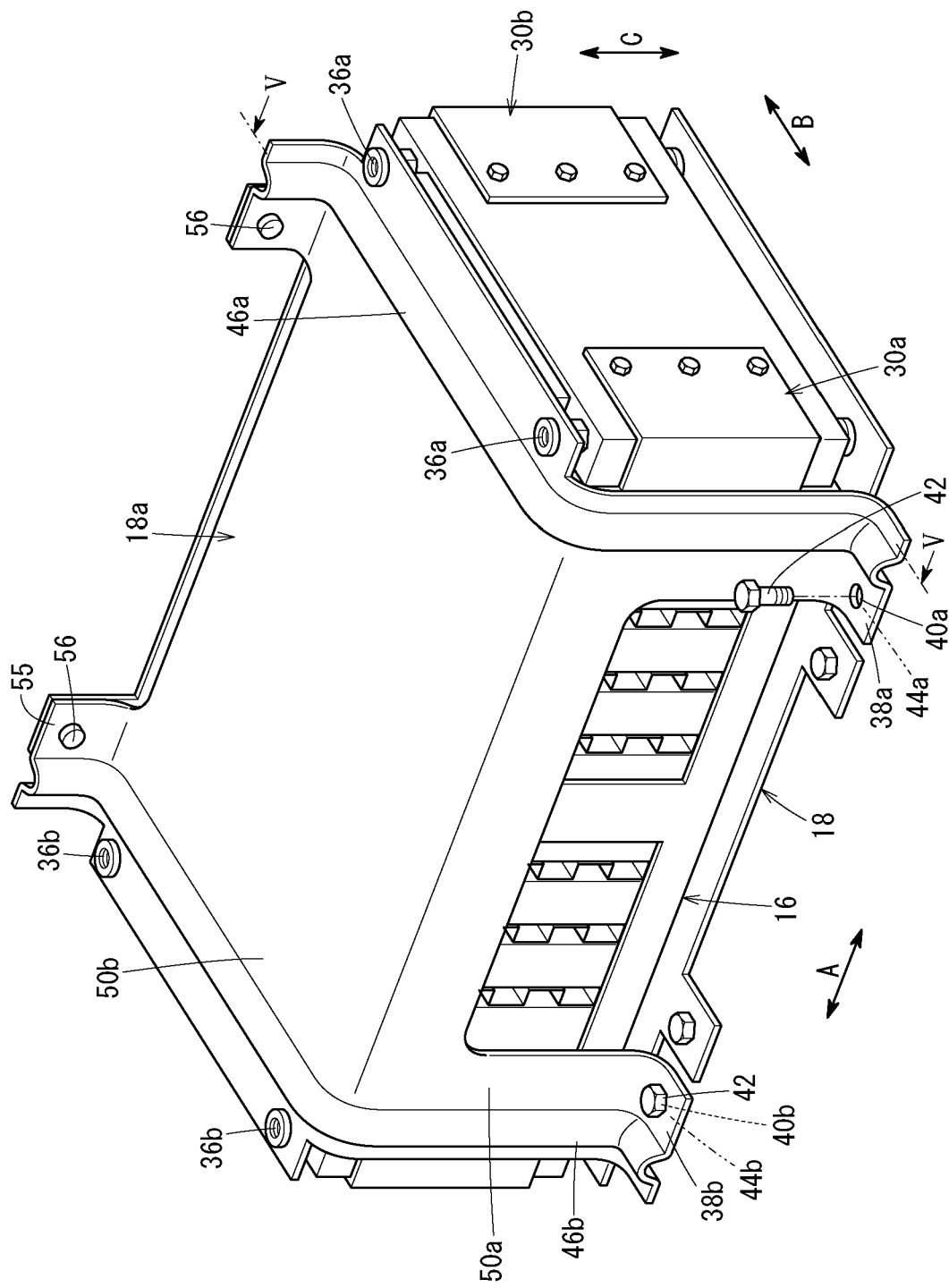
FIG. 4 is an explanatory perspective view of an added mounting plate that constitutes the electric storage device.
Figure 5:
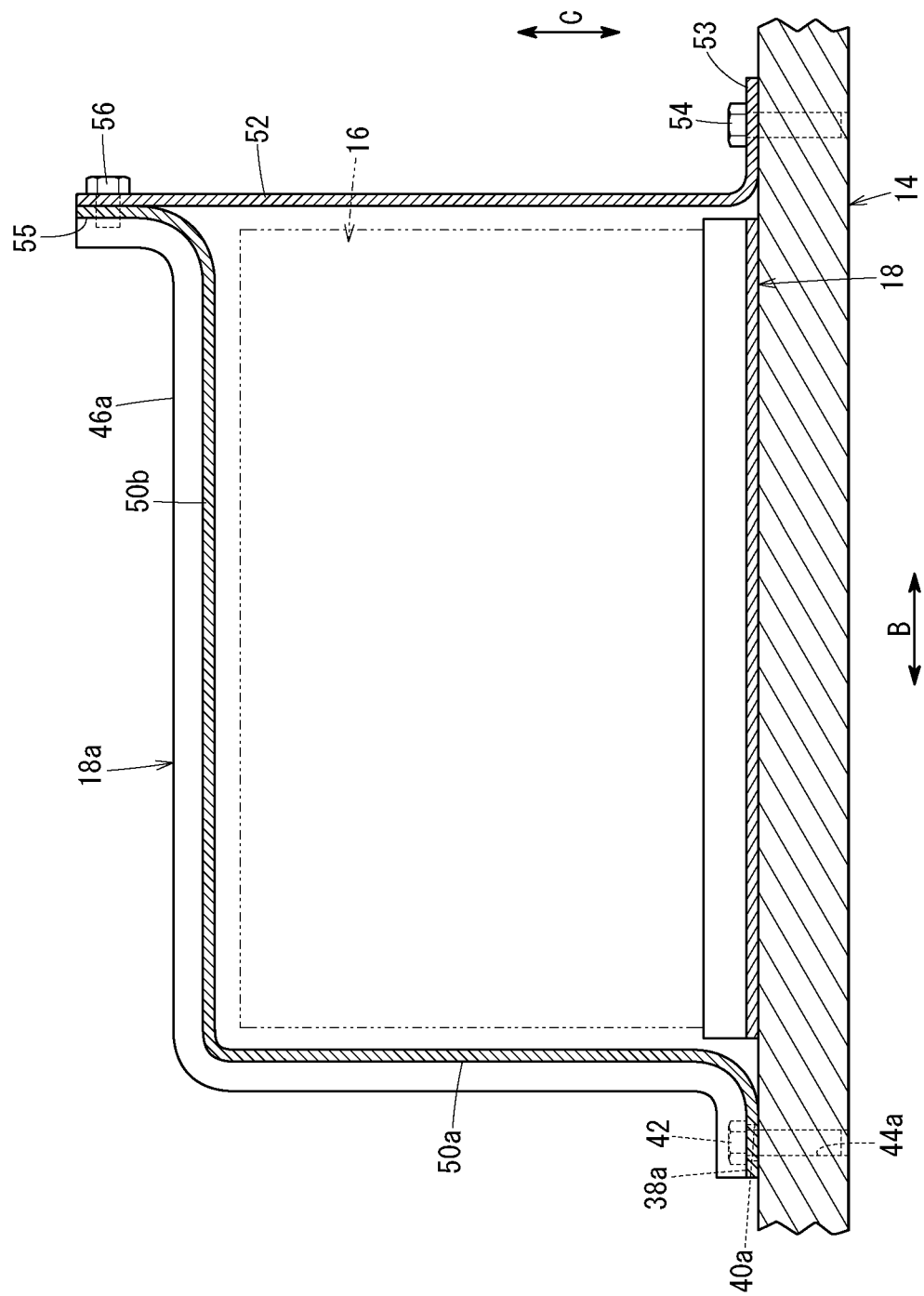
FIG. 5 is an explanatory cross-sectional view of the added mounting plate, taken along line V-V of FIG. 4.

As illustrated in FIGS. 4 and 5, the mounting plate 18a is formed by a metal plate, and has a vertical surface 50a extending in the vertical direction from a plate surface (horizontal surface) of the fixing plate 14. A horizontal portion 50b bent and extending in the horizontal direction is provided integrally with an upper end portion of the vertical surface 50a. A pair of screw holes 36a are provided in one end portion in the direction of arrow A of the horizontal portion 50b that constitutes the mounting plate 18a, and a pair of screw holes 36b are provided in the other end portion of the horizontal portion 50b.

Flange portions 38a and 38b serving as a fixing part project in the direction of arrow B from a lower end portion of the vertical surface 50a that constitutes the mounting plate 18a. The flange portions 38a and 38b have holes 40a and 40b, respectively, and screws 42 inserted in the holes 40a and 40b are screwed in screw holes 44a and 44b provided in the fixing plate 14. The mounting plate 18a is fixed to the fixing plate 14.

As illustrated in FIG. 4, the mounting plate 18a has displacement absorbing parts 46a and 46b that extend in the direction of arrow B (cell surface side direction intersecting the stacking direction of the storage cells 22) and absorb displacement in the stacking direction by being deformed by the load in the stacking direction. The displacement absorbing part 46a is provided between the screw holes 36a and the flange portion 38a (screw 42) in the stacking direction, and the displacement absorbing part 46b is provided between the screw holes 36b and the flange portion 38b (screw 42) in the stacking direction.

The displacement absorbing parts 46a and 46b are wavy curved portions extending in the direction of arrow B (cell side surface direction) and the direction of arrow C (cell side surface direction), and are continuously provided over the vertical surface 50a and the horizontal portion 50b.

As illustrated in FIG. 5, on a back side of the mounting plate 18a, a cover plate 52 is disposed to cover three surfaces of the storage module 16 together with the mounting plate 18a. Flange portions 53 provided in a lower end portion of the cover plate 52 are fixed to the fixing plate 14 by screws 54, and an upper end portion of the cover plate 52 is fixed to flange portions 55 provided in an upper part of the mounting plate 18a by screws 56.

In the electric storage device 10 having this structure, as illustrated in FIG. 2, the mounting plate 18 has the displacement absorbing parts 46a and 46b that absorb the displacement in the stacking direction by being deformed by the load in the stacking direction. For this reason, when the storage cells 22 expand and the storage module 16 bulges in the stacking direction of the storage cells 22, the mounting plate 18 that holds and fixes the storage module 16 deforms so that the displacement absorbing parts 46a and 46b extend in the stacking direction.

Specifically, the displacement absorbing parts 46a and 46b are wavy curved portions. In contrast, the flange portions 38a and 38b (fixing part) are provided on the inner sides of the screw holes 36a and 36b (fastening part), respectively, in the stacking direction. The displacement absorbing parts 46a and 46b are disposed between the flange portion 38a and the screw holes 36a and between the flange portion 38b and the screw holes 36b, respectively, in the stacking direction. Therefore, when the storage module 16 entirely bulges in the stacking direction, as illustrated in FIG. 3, a load (stress) of arrow F is applied to both end portions of the storage module 16.

The fixing screws 34 to be screwed in the screw holes 36a are inserted in the end plate 28a of the storage module 16. Thus, when the load is applied to the fixing screws 34, the displacement absorbing part 46a deforms so that the wavy shape becomes gentle, and this can absorb expansion of the storage cells 22 (see solid lines and two-dot chain lines in FIG. 3). For this reason, the screws 42 can be reliably prevented from loosening. In the end plate 28b, the displacement absorbing part 46b can deform and absorb expansion of the storage cells 22, similarly to the end plate 28a.

Therefore, even when the storage cells 22 expand and the dimension in the stacking direction changes, the change of the dimension can be easily and reliably absorbed by the displacement absorbing parts 46a and 46b. This provides the effect of ensuring a proper fixed state between the storage module 16 and the mounting plate 18.

Further, as illustrated in FIGS. 4 and 5, on an arbitrary storage module 16, another storage module 16 is stacked with the mounting plate 18a attached to the fixing plate 14 being disposed therebetween. The mounting plate 18a has the displacement absorbing parts 46a and 46b, similarly to the mounting plate 18, and can obtain effects similar to those of the mounting plate 18.

Figure 6:
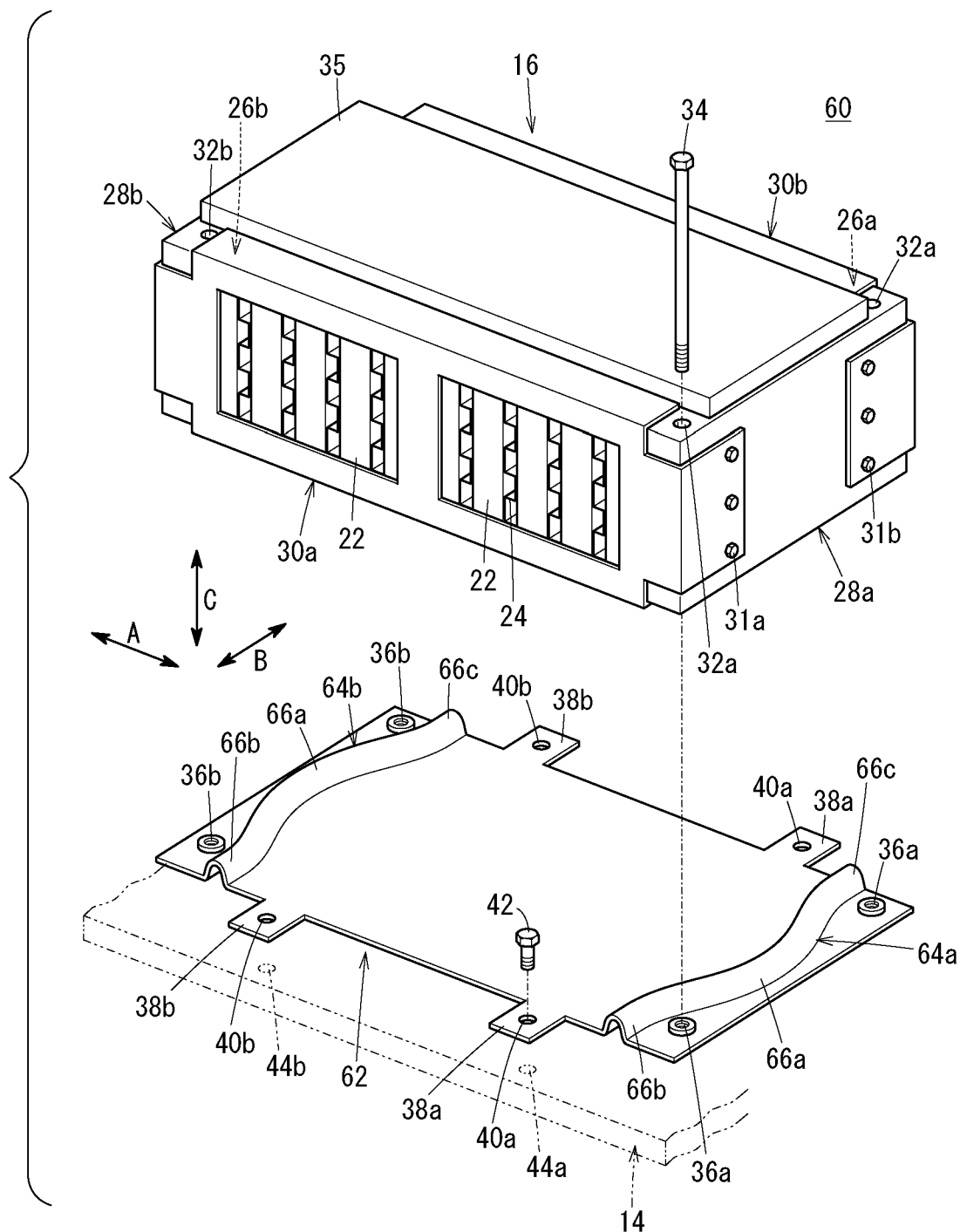
FIG. 6 is an exploded explanatory perspective view of the principal part of an electric storage device according to a second embodiment of the present disclosure.

FIG. 6 is an exploded explanatory perspective view of the principal part of an electric storage device 60 according to a second embodiment of the present disclosure. The same constituent elements as those of the electric storage device 10 of the first embodiment are denoted by the same reference numerals, and detailed descriptions thereof are skipped. In the following third embodiment, detailed descriptions are similarly skipped.

The electric storage device 60 includes a mounting plate 62, and the mounting plate 62 has displacement absorbing parts 64a and 64b that extend in the direction of arrow B and absorb displacement in the stacking direction by being deformed by the load in the stacking direction. The displacement absorbing part 64a is provided between screw holes 36a and flange portions 38a in the stacking direction, and the displacement absorbing part 64b is provided between screw holes 36b and flange portions 38b in the stacking direction. The displacement absorbing parts 64a and 64b are curved portions extending in the direction of arrow B (cell side surface direction), and have a wavy shape in a side view of the mounting plate 62 from the direction of arrow B.

Each of the displacement absorbing parts 64a and 64b includes a projecting center portion 66a projecting outward in the stacking direction at a center portion in the direction of arrow B and end portions 66b and 66c separating inward in the stacking direction from the projecting center portion 66a toward opposite ends in the direction of arrow B.

In the second embodiment that adopts this structure, the displacement absorbing parts 64a and 64b each include the projecting center portion 66a and the end portions 66b and 66c, and are set to have a wavy shape in plan view. For this reason, the rigidity of the entire mounting plate 62 can be further increased. Moreover, effects similar to those of the above-described first embodiment can be obtained, for example, deformation in the stacking direction can be properly caused.

Figure 7:
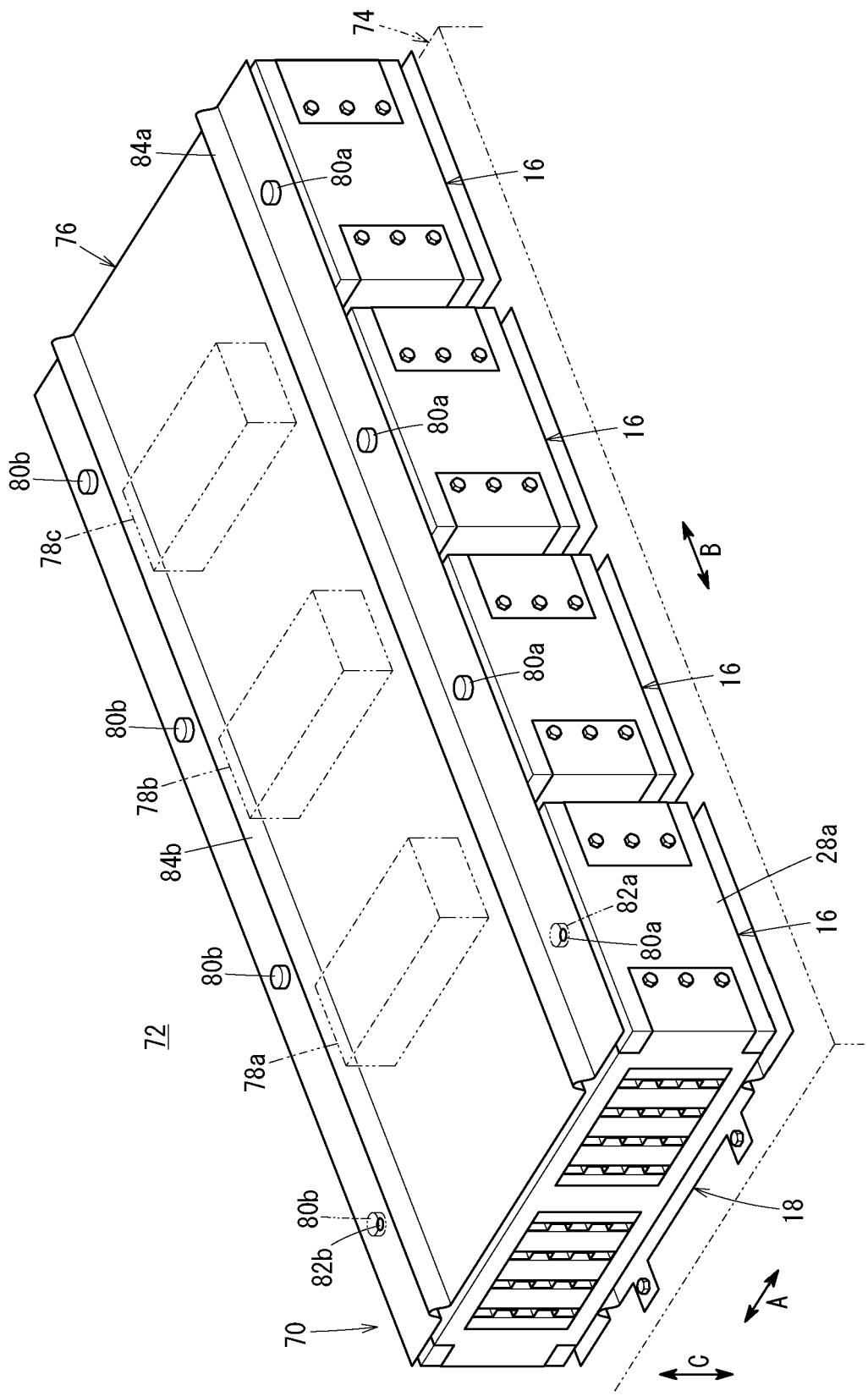
FIG. 7 is an explanatory perspective view of the principal part of a power unit in which an electric storage device according to a third embodiment of the present disclosure is incorporated.

FIG. 7 is an explanatory perspective view of the principal part of a power unit 72 in which an electric storage device 70 according to a third embodiment of the present disclosure is incorporated.

The power unit 72 includes a fixing plate (attachment part) 74 provided in a vehicle body frame (not illustrated). A plurality of storage modules 16 are mounted on the fixing plate 74 with a mounting plate 18 being disposed therebetween to constitute the electric storage device 70. A mounting plate 76 is integrally connected on a plurality of, for example, four storage modules 16, and various devices 78a, 78b, and 78c are mounted on the mounting plate 76. At least the device 78a, 78b, or 78c includes, for example, a power distribution component.

The mounting plate 76 is formed by a metal plate that is long in the arrangement direction of a plurality of, for example, four storage modules 16 (direction of arrow B intersecting the stacking direction), and integrally covers the four storage modules 16. The length of the short sides of the mounting plate 76 corresponds to the total length of storage cells 22 in the stacking direction. In one long side of the mounting plate 76, four holes 82a (fastening part) are provided so that holding pins 80a standing on upper surfaces of end plates 28a are to be inserted. In the other long side of the attachment plate 76, four holes 82b are provided so that holding pins 80b standing on upper surfaces of end plates 28b are to be inserted.

Figure 8:
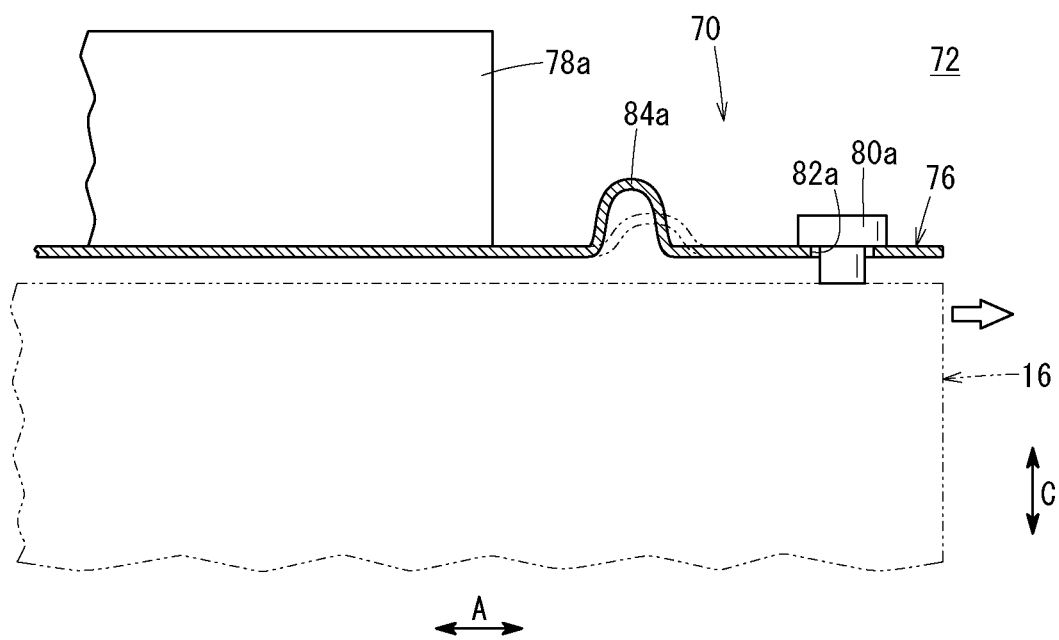
FIG. 8 is an explanatory side view of the principal part of the electric storage device.

The mounting plate 76 has displacement absorbing parts 84a and 84b that extend in the direction of arrow B (cell side surface direction intersecting the stacking direction of the storage cells 22) and absorb displacement in the stacking direction by being deformed by the load in the stacking direction. The displacement absorbing parts 84a and 84b are provided on inner sides of the holes 82a and 82b (fastening part), respectively, in the stacking direction. The displacement absorbing parts 84a and 84b are curved portions extending in the direction of arrow B (cell side surface direction), and have a wavy shape in a side view of the mounting plate 76 from the direction of arrow B (see FIGS. 7 and 8).

In the third embodiment that adopts this structure, the mounting plate 76 has the displacement absorbing parts 84a and 84b that absorb the displacement in the stacking direction by being deformed by the load in the stacking direction. For this reason, when the storage cells 22 expand and the storage modules 16 bulge in the stacking direction of the storage cells 22, the mounting plate 76 integrally provided on the storage modules 16 deforms so that the displacement absorbing parts 84a and 84b extend in the stacking direction.

Therefore, the devices 78a, 78b, and 78c mounted on the mounting plate 76 are not displaced unnecessarily. Particularly in the power distribution component that is remarkably affected by the displacement, the displacement can be minimized. This allows the power distribution component to be protected well.

Figure 9:
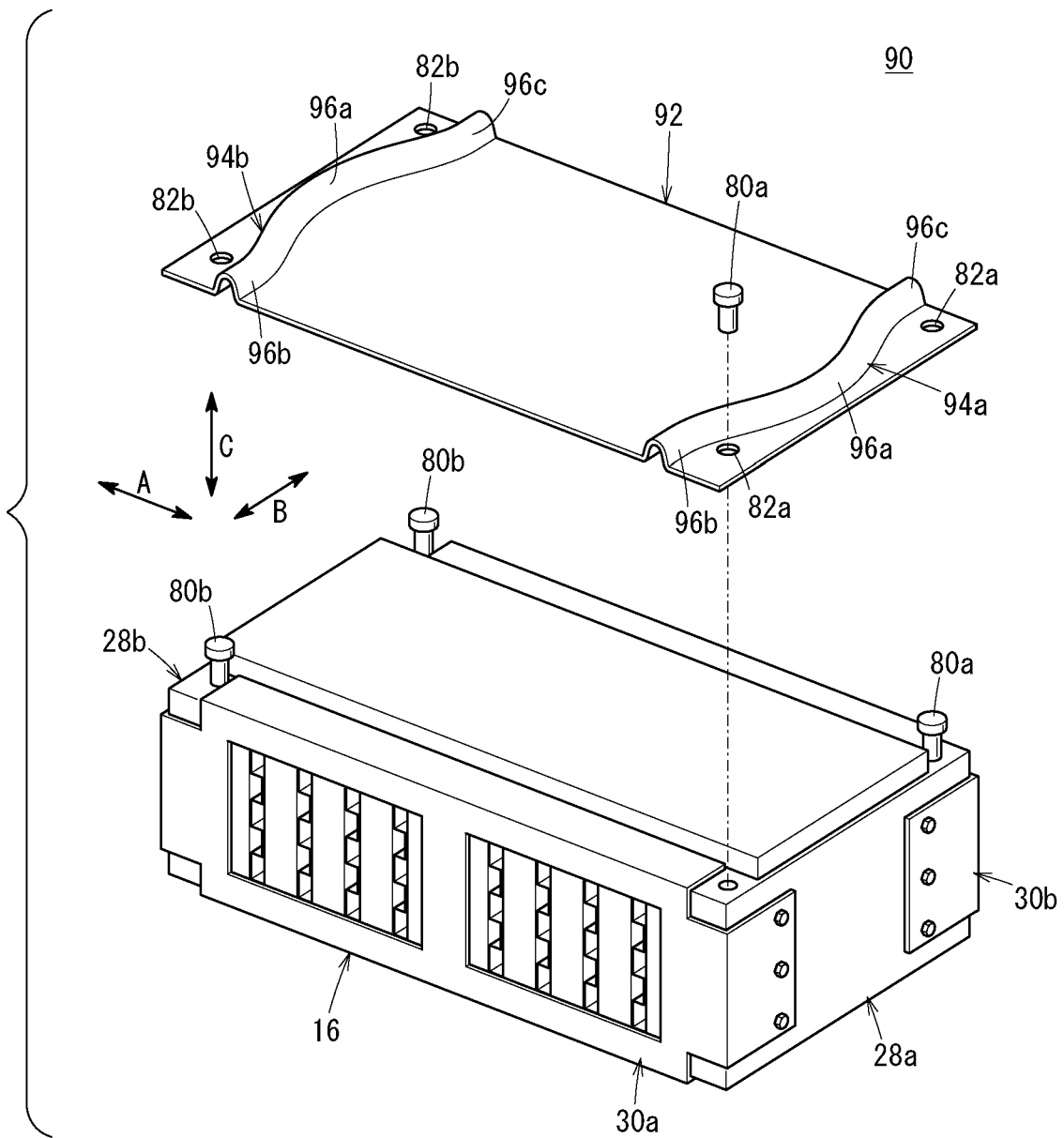
FIG. 9 is an exploded explanatory perspective view of the principal part of an electric storage device according to a fourth embodiment of the present disclosure.

FIG. 9 is an exploded explanatory perspective view of an electric storage device 90 according to a fourth embodiment of the present disclosure. The same constituent elements as those of the electric storage device 70 of the third embodiment are denoted by the same reference numerals, and detailed descriptions thereof are skipped.

In the electric storage device 90, a mounting plate 92 is connected onto a single (or a plurality of) storage module 16, and various devices (not illustrated) are mounted on the mounting plate 92. The mounting plate 92 is formed by a metal plate that is long in the stacking direction of storage cells 22. In one short side portion of the mounting plate 92, two holes 82a (fastening part) are provided so that two holding pins 80a standing on an upper surface of an end plate 28a are to be inserted therein. In the other short side portion of the attachment plate 92, two holes 82b (fastening part) are provided so that two holding pins 80b standing on an upper surface of an end plate 28b are to be inserted therein.

The mounting plate 92 has displacement absorbing parts 94a and 94b that extend in the direction of arrow B (cell side surface direction intersecting the stacking direction of the storage cells 22) and absorb displacement in the stacking direction by being deformed by the load in the stacking direction. The displacement absorbing parts 94a and 94b are provided on inner sides of the holes 82a and 82b (fastening part), respectively, in the stacking direction. The displacement absorbing parts 94a and 94b are curved portions extending in the direction of arrow B (cell side surface direction), and have a wavy shape in a side view of the mounting plate 92 from the direction of arrow B.

Each of the displacement absorbing parts 94a and 94b includes a projecting center portion 96a projecting outward in the stacking direction at a center portion in the direction of arrow B and end portions 96b and 96c separating inward in the stacking direction from the projecting center portion 96a toward opposite ends in the direction of arrow B.

In the fourth embodiment that adopts this structure, each of the displacement absorbing parts 94a and 94b includes the projecting center portion 96a and the end portions 96b and 96c, and is set to have a wavy shape in plan view. For this reason, the rigidity of the entire mounting plate 92 can be further increased, and effects similar to those of the above-described second embodiment can be obtained, for example, deformation can be properly caused in the stacking direction.

The fourth embodiment can be applied to the mounting plate 76 that constitutes the electric storage device 70 of the third embodiment.

An electric storage device according to an aspect of the present disclosure includes a storage module in which a plurality of storage cells are stacked, and a mounting plate connected to the storage module by being connected to a fastening part provided in the storage module.

Preferably, the mounting plate has a displacement absorbing part that extends in a cell side surface direction intersecting a stacking direction of the storage cells and absorbs displacement in the stacking direction by being deformed by a load in the stacking direction. The displacement absorbing part may be provided on an inner side of the fastening part in the stacking direction.

Preferably, the displacement absorbing part is a curved portion extending in the cell side surface direction, and has a wavy shape in a side view of the mounting plate from the cell side surface direction.

Preferably, the displacement absorbing part includes a projecting center portion projecting outward in the stacking direction at a center portion in the cell side surface direction and end portions separating inward in the stacking direction from the projecting center portion toward opposite sides in the cell side surface direction.

Preferably, the mounting plate includes a fixing part that holds the storage module and is fixed to an attachment part. At this time, preferably, the fixing part is provided on an inner side of the fastening part in the stacking direction, and the displacement absorbing part is disposed between the fixing part and the fastening part in the stacking direction.

According to the present disclosure, the mounting plate has the displacement absorbing part that absorbs the displacement in the stacking direction by being deformed by the load in the stacking direction. For this reason, when the storage cells expand in the stacking direction, the displacement absorbing part deforms to extend in the stacking direction. This can absorb the expansion of the storage cells. Therefore, it is possible to reliably prevent the fastening part from loosening.

Thus, even when the storage cells expand and the dimension in the stacking direction changes, the change of the dimension can be easily and reliably absorbed by the displacement absorbing part. This allows a proper fixed state between the storage module and the mounting plate.

Obviously, numerous modifications and variations of the present invention are possible in light of the above teachings. It is therefore to be understood that within the scope of the appended claims, the invention may be practiced otherwise than as specifically described herein.

What is claimed is:

1. An electric storage device comprising:
   a storage module in which a plurality of storage cells are stacked in a stacking direction, the plurality of storage cells including a first storage cell and a second storage cell that is adjacent to the first storage cell in the stacking direction; and
   a mounting plate connected to the storage module by being connected to a fastening part provided in the storage module,
   wherein the mounting plate has a displacement absorbing part that has a longest dimension that extends in a cell side surface direction that is perpendicular to the stacking direction of the plurality of storage cells, the displacement absorbing part is configured to absorb displacement in the stacking direction by being deformed by a load in the stacking direction,
   wherein the displacement absorbing part is provided on an inner side of the fastening part in the stacking direction,
   wherein the storage module is connected to the mounting plate in a vertical direction,
   wherein the longest dimension of the displacement absorbing part extends in a direction perpendicular to both of the vertical direction and the stacking direction,
   wherein the mounting plate includes a fixing part that holds the storage module and is fixed to an attachment part, and
   wherein the fixing part is provided on the inner side of the fastening part in the stacking direction, and the displacement absorbing part is disposed between the fixing part and the fastening part in the stacking direction.

2. The electric storage device according to claim 1, wherein the displacement absorbing part is a curved portion extending in the cell side surface direction, and has a wavy shape in a side view of the mounting plate from the cell side surface direction.

3. The electric storage device according to claim 1, wherein the displacement absorbing part includes:
   a projecting center portion projecting outward in the stacking direction at a center portion in the cell side surface direction; and
   end portions separating inward in the stacking direction from the projecting center portion toward opposite sides in the cell side surface direction.

4. The electric storage device according to claim 1, wherein the displacement absorbing part deforms in the stacking direction when the plurality of storage cells expand in the stacking direction.

5. The electric storage device according to claim 1, wherein the displacement absorbing part deforms in the stacking direction such that a length of the mounting plate in the stacking direction increases.

6. The electric storage device according to claim 1, wherein the displacement absorbing part allows and absorbs displacement in the stacking direction by being deformed by the load in the stacking direction.

7. The electric storage device according to claim 1, wherein each storage cell of the plurality of storage cells are elongated in the cell side surface direction.

8. The electric storage device according to claim 1, wherein the displacement absorbing part has a wavy shape when viewed in the cell side surface direction that is perpendicular to the stacking direction.

9. The electric storage device according to claim 1, wherein the displacement absorbing part is curved outward relative to a center of the storage module when viewed in a direction perpendicular to both the stacking direction and the cell side surface direction.

10. An electric storage device comprising:
a storage module including a plurality of storage cells stacked in a stacking direction, the storage module having an end plate with an end surface in the stacking direction, the plurality of storage cells including a first storage cell and a second storage cell that is adjacent to the first storage cell in the stacking direction; and
a mounting plate on which the storage module is mounted, the mounting plate comprising:
  a fastening part at which the end plate of the storage module is connected to the mounting plate; and
  a displacement absorbing part to absorb displacement of the storage module in the stacking direction, the fastening part being provided between the displacement absorbing part and the end surface of the end plate of the storage module in the stacking direction,
wherein the storage module is connected to the mounting plate in a vertical direction,
wherein the displacement absorbing part extends in a direction perpendicular to both of the vertical direction and the stacking direction,
wherein the mounting plate includes a fixing part that holds the storage module and is fixed to an attachment part, and
wherein the fixing part is provided on an inner side of the mounting plate than the fastening part in the stacking direction, and the displacement absorbing part is disposed between the fixing part and the fastening part in the stacking direction.

11. The electric storage device according to claim 10, wherein the displacement absorbing part is a curved portion extending in a cell side surface direction perpendicular to the stacking direction, and has a wavy shape in a side view of the mounting plate from the cell side surface direction.

12. The electric storage device according to claim 10, wherein the displacement absorbing part includes:
a projecting center portion projecting outward in the stacking direction at a center portion in a cell side surface direction perpendicular to the stacking direction; and
end portions separating inward in the stacking direction from the projecting center portion toward opposite sides in the cell side surface direction.

13. The electric storage device according to claim 10, wherein the displacement absorbing part has a longest dimension that extends in a cell side surface direction perpendicular to the stacking direction.

14. The electric storage device according to claim 10, wherein the displacement absorbing part deforms in the stacking direction when the plurality of storage cells expand in the stacking direction.

15. The electric storage device according to claim 10, wherein the displacement absorbing part deforms in the stacking direction such that a length of the mounting plate in the stacking direction increases.

16. The electric storage device according to claim 10, wherein the displacement absorbing part is spaced apart from the fastening part in the stacking direction.

17. An electric storage device comprising:
a storage module including a plurality of storage cells stacked in a stacking direction, the storage module having a first end plate at a first end of the plurality of storage cells in the stacking direction and a second end plate at a second end of the plurality of storage cells in the stacking direction, the plurality of storage cells including a first storage cell and a second storage cell that is adjacent to the first storage cell in the stacking direction; and
a mounting plate on which the storage module is mounted, the mounting plate comprising:
  a first fastening part at which the first end plate of the storage module is connected to the mounting plate;
  a second fastening part at which the second end plate of the storage module is connected to the mounting plate; and
  a displacement absorbing part to absorb displacement of the storage module in the stacking direction, the displacement absorbing part being provided between the first fastening part and the second fastening part in the stacking direction,
wherein the storage module is connected to the mounting plate in a vertical direction,
wherein the displacement absorbing part extends in a direction perpendicular to both of the vertical direction and the stacking direction,
wherein the mounting plate includes a fixing part that holds the storage module and is fixed to an attachment part, and
wherein the fixing part is provided on an inner side of the first fastening part in the stacking direction, and the displacement absorbing part is disposed between the fixing part and the first fastening part in the stacking direction.

18. The electric storage device according to claim 17, wherein the displacement absorbing part is spaced apart from the first fastening part and the second fastening part in the stacking direction.

* * * * *